United States Patent
Tobita et al.

(10) Patent No.: US 7,189,778 B2
(45) Date of Patent: *Mar. 13, 2007

(54) THERMALLY CONDUCTIVE POLYMER MOLDED ARTICLE AND METHOD FOR PRODUCING THE SAME

(75) Inventors: Masayuki Tobita, Isesaki (JP); Naoyuki Shimoyama, Saitama (JP); Tsukasa Ishigaki, Saitama (JP); Toru Kimura, Funabashi (JP)

(73) Assignee: Polymatech Co., Ltd., Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 10/623,860

(22) Filed: Jul. 21, 2003

(65) Prior Publication Data
US 2004/0152829 A1    Aug. 5, 2004

(30) Foreign Application Priority Data
Jul. 22, 2002    (JP)    ............... 2002-213051

(51) Int. Cl.
- *C08J 3/20*    (2006.01)
- *B32B 27/04*    (2006.01)
- *B29D 7/01*    (2006.01)
- *C09K 19/52*    (2006.01)
- *C09K 19/38*    (2006.01)

(52) U.S. Cl. ............... 524/495; 252/299.01; 252/299.5; 428/35.7; 428/297.4; 428/299.1; 257/E23.107

(58) Field of Classification Search ............... 428/1.1, 428/32.63, 35.7, 297.4, 299.1; 252/299.01, 252/299.5; 257/E23.107; 524/495

See application file for complete search history.

(56) References Cited

U.S. PATENT DOCUMENTS

| | | | |
|---|---|---|---|
| 6,652,958 B2 * | 11/2003 | Tobita | 428/298.1 |
| 6,730,731 B2 * | 5/2004 | Tobita et al. | 524/495 |
| 2001/0024724 A1 * | 9/2001 | McCullough | 428/408 |
| 2002/0090501 A1 * | 7/2002 | Tobita | 428/297.4 |
| 2004/0048054 A1 * | 3/2004 | Tobita et al. | 428/219 |

FOREIGN PATENT DOCUMENTS

| | | |
|---|---|---|
| EP | 1 199 328 A1 | 4/2002 |
| JP | 61-100430 | 5/1986 |
| JP | 62-100577 | 5/1987 |
| JP | 4-139222 | 5/1992 |
| JP | 5-271465 | 10/1993 |
| JP | 2001-523892 | 11/2001 |
| JP | 2002-088257 | 3/2002 |

OTHER PUBLICATIONS

Englisg translation by computer for JP 2002-88257, http://www4.ipdl.ncipi.go.jp/Tokujitu/PAJdetail.ipdl?N0000=60&N0120=01&N2001=2&N3001=2002-088257.*

* cited by examiner

*Primary Examiner*—Shean C Wu
(74) *Attorney, Agent, or Firm*—Fish & Richardson P.C.

(57) ABSTRACT

A thermally conductive polymer molded article formed by molding a thermally conductive composition which comprises a liquid crystalline polymer and thermally conductive filler having magnetic anisotropy, wherein the liquid crystalline polymer and the thermally conductive filler are oriented in a predetermined direction by a magnetic field. The thermally conductive composition contains 100 parts by weight of the liquid crystalline polymer and 5 to 800 parts by weight of the thermally conductive filler having magnetic anisotropy. The thermally conductive filler has a thermal conductivity in at least one direction higher than the thermal conductivity of the liquid crystalline polymer.

15 Claims, 2 Drawing Sheets

THERMALLY CONDUCTIVE POLYMER MOLDED ARTICLE AND METHOD FOR PRODUCING THE SAME

BACKGROUND OF THE INVENTION

The present invention relates to a thermally conductive polymer molded article and a method for producing the same. More particularly, the present invention concerns a thermally conductive polymer molded article which can exhibit excellent thermal conductivity, and a method for producing the same.

In recent years, in accordance with a trend toward high performance, downsizing, and reduction in weight of electronic equipments, the mounting density in semiconductor packages, the integration degree, and speed in LSIs have increased. Accordingly, the heat generated by various electronic parts has increased, and measures for dissipating heat out of the electronic parts become a very important task. For achieving this, a thermally conductive molded article comprised of a heat-radiating material, such as a metal, ceramic, or a polymer composition, is used in printed circuit boards, semiconductor packages, housings, and heat-radiating members, such as heat pipes, radiating panels, and heat diffusion panels.

Among these radiating members, a thermally conductive molded article comprised of a polymer composition (hereinafter referred to as "thermally conductive polymer molded article") is easily molded into a desired shape and lightweight, and hence widely used.

A polymer composition is known in the art constituting a thermally conductive polymer molded article, which comprises a thermally conductive filler having a high thermal conductivity and which is incorporated in a polymer matrix such as a resin or a rubber. Examples of thermally conductive fillers include metal oxides, such as aluminum oxide, magnesium oxide, zinc oxide, and quartz; metal nitrides, such as boron nitride and aluminum nitride; metal carbides, such as silicon carbide; metal hydroxides, such as aluminum hydroxide; metals, such as gold, silver, and copper; carbon fibers; and graphite.

A polymer composition and a thermally conductive polymer molded article using as a matrix a thermotropic liquid crystalline polymer have been proposed in an application which requires high heat resistance without deformation of the radiating member under high temperature conditions during mounting of electronic parts or during use. Such a thermotropic liquid crystalline polymer has excellent moldability and excellent heat resistance. For example, Japanese Laid-open Patent Publication No. 62-100577 discloses a composition having excellent thermal conductivity, comprising a specific thermally conductive filler and a thermotropic liquid crystalline polymer. Japanese Laid-open Patent Publication No. 5-271465 discloses an electrical insulating composition having excellent thermal conductivity, which comprises 50 to 90% by weight of zircon as a thermally conductive filler and 50 to 10% by weight of a thermotropic liquid crystalline polymer. Further, Japanese National Phase Laid-open Publication No. 2001-523892 discloses a composition comprising 20 to 80% by weight of thermally conductive filler, such as carbon fibers, and 80 to 20% by weight of a thermotropic liquid crystalline polymer.

However, recently, as the performance of electronic parts has improved, it is likely that heat generated by electronic parts is increased. Accordingly, the thermal conductivity of the thermally conductive polymer molded articles in the above prior art is unsatisfactory for dissipating such increased heat.

The present invention deals with the above-mentioned problems accompanying the prior art. An object of the present invention is to provide a thermally conductive polymer molded article which can exhibit excellent thermal conductivity, and a method for producing the same.

BRIEF SUMMARY OF THE INVENTION

The present invention provides a thermally conductive polymer molded article formed by molding a thermally conductive composition. The thermally conductive composition comprises a liquid crystalline polymer having a first thermal conductivity; and a thermally conductive filler having a second thermal conductivity in at least one direction, which has magnetic anisotropy. The liquid crystalline polymer and the thermally conductive filler are oriented in the molded article by a magnetic field.

The present invention also provides a method for producing a thermally conductive polymer molded article formed of a thermally conductive composition. The thermally conductive composition comprising a liquid crystalline polymer and a thermally conductive filler having magnetic anisotropy. The method comprises steps of: providing the thermally conductive composition into a mold; allowing the liquid crystalline polymer in the thermally conductive composition in the mold to undergo phase transition to a liquid crystalline state; placing the thermally conductive composition in the mold in a magnetic field, thereby orienting the liquid crystalline polymer and the thermally conductive filler contained in the thermally conductive composition in a predetermined direction; allowing the liquid crystalline polymer in a liquid crystalline state to undergo phase transition to a solid state; and solidifying the thermally conductive composition and removing the solidified composition from the mold.

The present invention is further directed to an apparatus for producing a thermally conductive polymer molded article formed of a thermally conductive composition abovedescribed. The apparatus comprises a mold having a cavity for containing the thermally conductive composition therein to mold the thermally conductive composition into a predetermined shape; and a magnetic field generating device, located so that magnetic lines of force generated by the magnetic field generating device pass the cavity of the mold.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
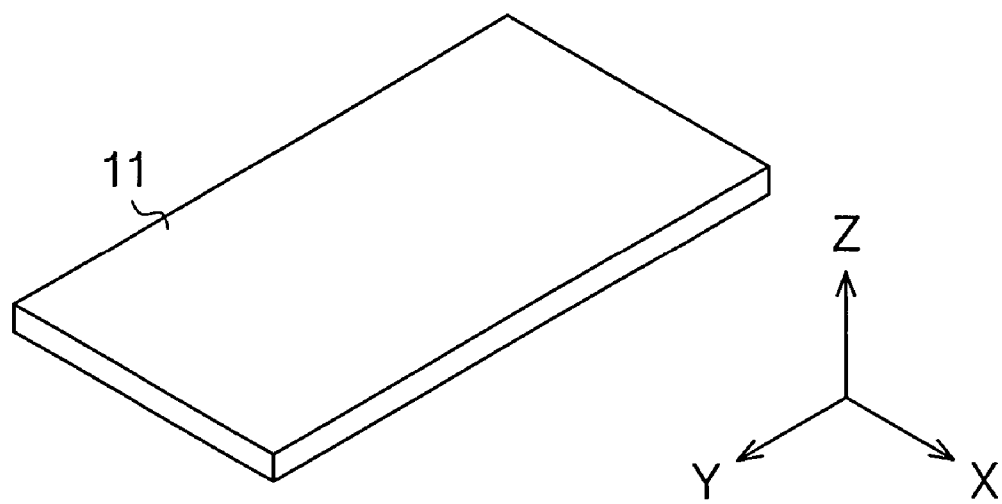
FIG. 1 is a perspective view of a thermally conductive polymer molded article according to one embodiment of the present invention.

Now, the thermally conductive polymer molded article of the present invention will be described in detail.

In one embodiment of the present invention, the thermally conductive polymer molded article is obtained by molding a thermally conductive composition. The thermally conductive composition comprises a liquid crystalline polymer and a thermally conductive filler having magnetic anisotropy. The liquid crystalline polymer and the thermally conductive filler are magnetically oriented in a predetermined direction in the molded article.

Firstly, the thermally conductive composition is described.

The liquid crystalline polymer is incorporated into the thermally conductive composition to improve the thermal conductivity of the thermally conductive polymer molded article obtained from the composition. Specific examples of liquid crystalline polymers include thermotropic liquid crystalline polymers and lyotropic liquid crystalline polymers. The thermotropic liquid crystalline polymer will be in a liquid crystalline state in a certain temperature range exhibiting a molten phase having optical anisotropy when melted by heating. Alternatively, the lyotropic liquid crystalline polymer will be in a liquid crystalline state having optical anisotropy when dissolved in a solvent in a certain concentration range. Among these liquid crystalline polymers, thermotropic liquid crystalline polymers are preferred because of their thermoplasticity and good moldability. In these liquid crystalline polymers in a liquid crystalline state, the molecular chains of the polymer are orderly oriented to exhibit optical anisotropy. The optical anisotropy can be confirmed by a conventional polarization inspection method utilizing an orthogonal polarizer.

Specific examples of thermotropic liquid crystalline polymers include thermotropic liquid crystalline polyesters, polyester amides, polyester ethers, polyester carbonates, and polyester imides. The thermotropic liquid crystalline polymers include main-chain type, side-chain type, and combined type thermotropic liquid crystalline polymers. The main-chain type thermotropic liquid crystalline polymer has a mesogen group, which exhibits a liquid crystalline structure, in the main chain. Examples of main-chain type thermotropic liquid crystalline polymers include polyester copolymers (e.g., copolymers of polyethylene terephthalate and hydroxybenzoic acid) and copolymers of hydroxynaphthoic acid and hydroxybenzoic acid. The side-chain type thermotropic liquid crystalline polymer has a mesogen group in the side chain. More specifically, the side-chain type thermotropic liquid crystalline polymer comprises a repeating unit wherein a mesogen group as a side chain is connected to an ethylene or siloxane main chain. The combined type thermotropic liquid crystalline polymer comprises a combination of the main-chain type and side-chain type thermotropic liquid crystalline polymers.

One example of thermotropic liquid crystalline polyesters is thermotropic liquid crystalline wholly aromatic polyesters (A). The thermotropic liquid crystalline wholly aromatic polyester generally comprises a segment to constitute the optical anisotropic molten phase (referred to as "first segment" hereafter), which may be comprised of ester of an aromatic carboxylic acid and an aromatic alcohol. The thermotropic liquid crystalline wholly aromatic polyester in the present embodiment also may have a segment to not constitute the optical anisotropic molten phase (referred to as "second segment" hereafter), which may be comprised of ester of aliphatic or alicyclic acid and alcohol. The thermotropic liquid crystalline wholly aromatic polyester used in the present invention may have both of the first and second segments. In this case, the first segment may be comprised of ester of aliphatic or alicyclic acid and alcohol, and the second segment may be comprised of ester of an aromatic carboxylic acid and an aromatic alcohol. Further, the second segment can be comprised of either ester of an aliphatic or alicyclic acid and an aromatic alcohol or ester of an aliphatic or alicyclic alcohol and an aromatic carboxylic acid.

Examples of constituents of the thermotropic liquid crystalline wholly aromatic polyester include (a) aromatic dicarboxylic acid compounds, and alicyclic dicarboxylic acid compounds, (b) aromatic hydroxycarboxylic acid compounds, (c) aromatic diol, alicyclic diol, and aliphatic diol compounds, (d) aromatic dithiol, aromatic thiophenol, and aromatic thiolcarboxylic acid compounds, and (e) aromatic hydroxyamine and aromatic diamine compounds. Among these constituents (a) to (e), one constituent may be solely used, however, generally, an arbitrary number of constituents selected from (a) to (e) can be used in combination.

As examples of aromatic dicarboxylic acid compounds (a), there can be mentioned aromatic dicarboxylic acids and derivatives thereof. Examples of aromatic dicarboxylic acids include terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and 1,6-naphthalenedicarboxylic acid. Examples of aromatic dicarboxylic acid derivatives include aromatic dicarboxylic acids introduced with a substituent, such as alkyl, alkoxy, or a halogen, e.g., chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

As examples of alicyclic dicarboxylic acid compounds (a), there can be mentioned alicyclic dicarboxylic acids and derivatives thereof. Examples of alicyclic dicarboxylic acids include trans-1,4-cyclohexanedicarboxylic acid, cis-1,4-cyclohexanedicarboxylic acid, and 1,3-cyclohexanedicarboxylic acid. Examples of alicyclic dicarboxylic acid derivatives include alicyclic dicarboxylic acids introduced with a substituent(s), such as alkyl, alkoxy, or a halogen, e.g., trans-1,4-(2-methyl) cyclohexanedicarboxylic acid and trans-1,4-(2-chloro) cyclohexanedicarboxylic acid.

As examples of aromatic hydroxycarboxylic acid compounds (b), there can be mentioned aromatic hydroxycarboxylic acids and derivatives thereof. Examples of aromatic hydroxycarboxylic acids include 4-hydroxybenzoic acid, 3-hydroxybenzoic acid, 6-hydroxy-2-naphthoic acid, and 6-hydroxy-1-naphthoic acid. Examples of aromatic hydroxycarboxylic acid derivatives include aromatic hydroxycarboxylic acids introduced with a substituent(s), such as alkyl, alkoxy, or a halogen, e.g., 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

As examples of aromatic diol compounds (c), there can be mentioned aromatic diols and derivatives thereof. Examples of aromatic diols include 4,4'-dihydroxydiphenyl, 3,3'-dihydroxydiphenyl, 4,4'-dihydroxytriphenyl, hydroquinone, resorcin, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis(4-hydroxyphenyl)propane, and bis(4-hydroxyphenyl)methane. Examples of aromatic diol derivatives include aromatic diols introduced with a substituent(s), such as alkyl, alkoxy, or a halogen, e.g., chlorohydroquinone, methylhydroquinone, t-butylhydroquinone, phenylhydroquinone, methoxyhydroquinone, phenoxyhydroquinone, 4-chlororesorcin, and 4-methylresorcin.

As examples of alicyclic diol compounds (c), there can be mentioned alicyclic diols and derivatives thereof. Examples of alicyclic diols include trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol. Examples of alicyclic diol derivatives include alicyclic diols introduced with a substituent(s), such as alkyl, alkoxy, or a halogen, e.g., trans-1,4-(2-methyl)cyclohexanediol and trans-1,4-(2-chloro) cyclohexanediol.

Examples of aliphatic diol compounds (c) include linear or branched aliphatic diols, such as ethylene glycol, 1,3-propanediol, 1,4-butanediol, and neopentyl glycol.

Examples of aromatic dithiol compounds (d) include benzene-1,4-dithiol, benzene-1,3-dithiol, 2,6-naphthalenedithiol, and 2,7-naphthalenedithiol.

Examples of aromatic thiophenol compounds (d) include 4-mercaptophenol, 3-mercaptophenol, and 6-mercaptophenol.

Examples of aromatic thiolcarboxylic acid compounds (d) include 4-mercaptobenzoic acid, 3-mercaptobenzoic acid, 6-mercapto-2-naphthoic acid, and 7-mercapto-2-naphthoic acid.

Examples of aromatic hydroxyamine compounds (e) include 4-aminophenol, N-methyl-4-aminophenol, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, and 4,4'-ethylenedianiline.

Examples of aromatic diamine compounds (e) include 1,4-phenylenediamine, N-methyl-1,4-phenylenediamine, N,N'-dimethyl-1,4-phenylenediamine, 4,4'-diaminophenyl sulfide (thiodianiline), 4,4'-diaminodiphenyl sulfone, 2,5-diaminotoluene, 4,4'-diaminodiphenoxyethane, 4,4'-diaminodiphenylmethane (methylenedianiline), and 4,4'-diaminodiphenyl ether (oxydianiline).

As examples of thermotropic liquid crystalline polyester amides, there can be mentioned thermotropic liquid crystalline wholly aromatic polyester amides (B). The thermotropic liquid crystalline wholly aromatic polyester amides, for example, include two or more constituents selected from the following substances: an aromatic diamine, an aromatic dicarboxylic acid, an aromatic diol, an aromatic aminocarboxylic acid, an aromatic oxycarboxylic acid, an aromatic oxyamino compound, and a derivative thereof. The thermotropic liquid crystalline polymer used in the present invention comprises preferably at least one selected from thermotropic liquid crystalline wholly aromatic polyester (A) and thermotropic liquid crystalline wholly aromatic polyester amide (B), more preferably thermotropic liquid crystalline wholly aromatic polyester (A) so as to readily obtain a thermally conductive polymer molded article with high thermal conductivity.

In the present invention, the thermally conductive filler is incorporated into the thermally conductive polymer composition in order to impart thermal conductivity to the thermally conductive molded article obtained from the composition. The thermally conductive filler used in the present invention has magnetic anisotropy, and can be oriented in a predetermined direction when placed in a magnetic field. It is preferred that the thermally conductive filler has a thermal conductivity ($\lambda_2$) in at least one direction higher than the thermal conductivity ($\lambda_1$) of the liquid crystalline polymer. It is preferred that the thermally conductive filler has diamagnetism having a magnetic susceptibility ($\chi$) in negative value. The direction of the magnetic orientation depends on the anisotropic magnetic susceptibility ($\chi_a = |\chi_{//} - \chi_\perp|$) which is a difference between the magnetic susceptibility ($\chi_{//}$) in the direction of the magnetic field applied and the magnetic susceptibility ($\chi_\perp$) in the direction perpendicular to the direction of the magnetic field applied. Having higher anisotropic magnetic susceptibility ($\chi_a$), the thermally conductive filler tends to be oriented more easily by the magnetic field.

The anisotropic magnetic susceptibility ($\chi_a$) depends on the structure and form of the thermally conductive filler. The thermally conductive filler has preferably an anisotropic magnetic susceptibility ($\chi_a$) of $10^{-9}$ to $10^{-1}$, more preferably $10^{-8}$ to $10^{-1}$. When the anisotropic magnetic susceptibility of the thermally conductive filler is less than $10^{-9}$, controlling of the orientation of the thermally conductive filler may be difficult. On the other hand, it is difficult to obtain a thermally conductive filler having an anisotropic magnetic susceptibility of more than $10^{-1}$.

In the present embodiment, specific examples of thermally conductive filler include carbon fibers, graphite, metal nitrides, metal carbides, metal oxides, graphitized carbon fibers, natural graphite, spherical graphite particles, mesocarbon microbeads, whisker carbon, microcoiled carbon, and nanostructure fillers.

The metal nitrides include boron nitride, silicon nitride, and aluminum nitride, and the metal carbides include silicon carbide. The metal oxides include aluminum oxide, magnesium oxide, silicon oxide, and zinc oxide. The carbon fibers include polyacrylonitrile (PAN) carbon fibers, mesophase pitch (pitch) carbon fibers, and carbon fibers obtained by a vapor deposition process. The nanostructure fillers include a carbon nanocoil, a carbon nanotube, and a carbon nanohorn.

The amount of the thermally conductive filler incorporated in the thermally conductive composition is 5 to 800 parts by weight, preferably 30 to 400 parts by weight, more preferably 50 to 250 parts by weight, relative to 100 parts by weight of the liquid crystalline polymer. When the amount of the incorporated thermally conductive filler is less than 5 parts by weight, the thermal conductivity of the thermally conductive polymer molded article may be insufficient. On the other hand, when the amount of the incorporated thermally conductive filler exceeds 800 parts by weight, the viscosity of the thermally conductive composition is increased, preventing the thermally conductive filler from uniformly dispersing in the thermotropic liquid crystalline polymer. This may result in a difficulty in the magnetic orientation of the thermally conductive filler as well as a problem in that the resultant thermally conductive polymer molded article contains air bubbles.

A thermal conductivity ($\lambda_1$) (hereinafter referred to as "first thermal conductivity") of a liquid crystalline polymer itself or a liquid crystalline polymer molded article obtained by molding the liquid crystalline polymer without applying a magnetic field to them is at most about 0.5 W/(m·K). It is preferred that the thermally conductive filler has a thermal conductivity ($\lambda_2$) (hereinafter referred to as "second thermal conductivity") in at least one direction which is higher than the first thermal conductivity ($\lambda_1$) of the liquid crystalline polymer. The second thermal conductivity ($\lambda_2$) is preferably 20 to 2000 W/(m·K), more preferably 200 to 2000 W/(m·K). When the second thermal conductivity ($\lambda_2$) is less than 20 W/(m·K), improvement of the thermally conductive polymer molded article in thermal conductivity may be insufficient. On the other hand, it is difficult to obtain a thermally conductive filler having thermal conductivity of more than 2000 W/(m·K)

There is no particular limitation with respect to the form, particle size, degree of aggregation, and the distribution of the particle size and the degree of aggregation of the thermally conductive filler. When incorporating a thermally conductive filler in a plate form, a flake form, or a sphere form, the particle size of the filler is preferably 0.01 to 200 μm, more preferably 0.5 to 150 μm, more preferably 1.0 to 100 μm. When the particle size of the thermally conductive filler is less than 0.01 μm or exceeds 200 μm, the dispersibility of the thermally conductive filler in the liquid crystalline polymer may be lowered. In addition, the viscosity of the thermally conductive composition is increased, so that magnetic orientation may be difficult, even when a small amount of the filler is incorporated. The thermally conductive filler in a fiber form or a whisker form has preferably a length of 0.1 to 250 μm, more preferably 50 to 200 μm, still more preferably 100 to 150 μm. When the length of the thermally conductive filler is shorter than 0.1 μm, the viscosity of the thermally conductive composition is increased, resulting in a difficulty in the magnetic orientation. On the other hand, when the length is longer than 200 μm, the fibers or whiskers are easily intertwined, resulting in a difficulty in the magnetic orientation.

The thermally conductive filler in the present invention preferably comprises at least one filler selected from carbon fibers, graphite, boron nitride, silicon nitride, aluminum nitride, silicon carbide, and aluminum oxide; more preferably at least one filler selected from carbon fibers and graphite, since these thermally conductive fillers have preferred second thermal conductivity ($\lambda_2$).

With respect to each of the carbon fibers and graphite used in the present invention, the second thermal conductivity ($\lambda_2$) in at least one direction is preferably 200 to 2000 W/(m·K), more preferably 400 to 2000 W/(m·K), more preferably 1000 to 2000 W/(m·K). If the second thermal conductivity ($\lambda_2$) is less than 20 W/(m·K), improvement of the thermally conductive polymer molded article in thermal conductivity may be unsatisfactory. On the other hand, it is difficult to obtain thermally conductive filler having thermal conductivity of more than 2000 W/(m·K).

In carbon fibers and graphite, the thermal conductivity (e.g., 1000 W/(m·K)) in the direction of the fiber axis or in the direction perpendicular to the c axis of the graphite crystal is very higher, as compared to the thermal conductivity (30 W/(m·K)) in the direction perpendicular to the fiber axis or in the direction of the c axis of the graphite crystal. Typically, carbon fibers and graphite have a higher anisotropic magnetic susceptibility ($\chi_a$), as compared to other thermally conductive fillers. For example, a pitch carbon fiber has an anisotropic magnetic susceptibility ($\chi_a$) of $10^{-4}$. For this reason, carbon fibers and graphite tend to be oriented readily. By applying the magnetic field, the carbon fibers and graphite can be magnetically oriented so that the direction of the fiber axis or the direction perpendicular to the c axis of the crystal of graphite, which has a higher thermal conductivity, is parallel to the desired thermal conduction direction.

There is no particular limitation with respect to the type, size, and form of the carbon fibers used in the present invention, but preferred carbon fibers are a pitch carbon fiber and carbon fibers obtained by graphitizing polyimide fiber or polybenzasol fiber, and a more preferred carbon fiber is a pitch carbon fiber, since it has a higher thermal conductivity in the direction of the fiber axis.

The pitch carbon fiber can be obtained by subjecting raw materials to treatment steps of, e.g., melt spinning, infusibilization, and carbonization, followed by heat treatment at a temperature as high as 2000 to 3000° C. or higher. The pitch carbon fiber is graphitized with an advanced graphite structure. This carbon fiber preferably has a thermal conductivity in the longitudinal direction of the fiber of 200 to 2000 W/(m·K), more preferably 400 to 2000 W/(m·K), still more preferably 1000 to 2000 W/(m·K). The carbon fiber to be used in the present invention has a diameter of about 2 to 30 μm, and, in case of a short fiber, a fiber length of about 5 to 500 μm.

As to boron nitride to be used in the present invention, preferably it is hexagonal boron nitride which is flake-form or plate-form particles. In the hexagonal boron nitride, the thermal conductivity {57 W/(m·K)} in the direction (hereinafter referred to as "first direction") parallel to the surface of the flake or plate particles is higher, as compared to the thermal conductivity {3 W/(m·K)} in the thickness direction of the flake or plate particles. The hexagonal boron nitride has an anisotropic magnetic susceptibility ($\chi_a$) of $10^{-5}$. When a magnetic field is applied to the hexagonal boron nitride particles in a desired thermal conduction direction, the hexagonal boron nitride can be oriented so that the first direction of the flake or plate particles having a higher thermal conductivity is parallel to the desired thermal conduction direction.

As examples of aluminum oxide having magnetic anisotropy which can be oriented by a magnetic field, there can be mentioned plate-form aluminum oxide, such as plate-form α-alumina. Spherical aluminum oxide, such as spherical α-alumina, has no magnetic anisotropy and hence is not oriented by a magnetic field. Therefore, spherical aluminum oxide is not included in the aluminum oxide having magnetic anisotropy usable for the present invention.

The nanostructure filler is bulky and hence, when an increased amount of the nanostructure filler is incorporated, the viscosity of the resultant thermally conductive composition is likely to rise. However, when a small amount of the nanostructure filler is incorporated, together with other thermally conductive filler, a thermally conductive polymer molded article can be obtained with satisfactory thermal conductivity in a desired thermal conduction direction due to magnetic orientation.

When the obtained thermally conductive polymer molded article is used in the application which requires electrical insulation properties, it is preferred to incorporate thermally conductive fillers having electrical insulation properties among the above thermally conductive fillers. Examples of thermally conductive fillers having electrical insulation properties include the above-mentioned metal oxides, metal nitrides, and metal carbides.

When a lyotropic liquid crystalline polymer is incorporated as a liquid crystalline polymer into the thermally conductive composition in the present invention, the composition contains a solvent for dissolving the lyotropic liquid crystalline polymer. With respect to the solvent, there is no particular limitation as long as the solvent can dissolve the lyotropic liquid crystalline polymer. However, the solvent serves also as a dispersion medium for the thermally conductive fillers. Therefore, the selection of the solvent preferably takes into consideration the dispersibility of the thermally conductive filler. The amount of the solvent in the thermally conductive composition is selected so that the lyotropic liquid crystalline polymer can exhibit a liquid crystalline state.

For improving the thermally conductive composition in heat resistance and moldability, a small amount of other polymers can be incorporated into the thermally conductive composition. Examples of other polymers include polyethylene terephthalate, polybutylene terephthalate, polyethylene naphthalate, polyallylate, polyester carbonate, polycarbonate, polyimide, polyether imide, polyamide, polyurethane, polyester elastomers, polystyrene, acrylic polymers, polysulfone, silicone polymers, halogen polymers, and olefin polymers.

The thermally conductive composition further may contain a small amount of a reinforcement, such as glass fiber, a pigment, a dye, a fluorescent brightener, a dispersant, a stabilizer, an ultraviolet absorber, an energy quencher, an antistatic agent, an antioxidant, a flame retardant, a heat stabilizer, a lubricant, a plasticizer, or a solvent.

The thermally conductive composition is obtained by kneading the ingredients together by means of a kneading machine, such as an extruder or a kneader. When a lyotropic liquid crystalline polymer is used as a liquid crystalline polymer, the lyotropic liquid crystalline polymer is dissolved in a solvent and the thermally conductive filler is dispersed in the solvent by means of an agitation machine to obtain a thermally conductive composition.

Next, the thermally conductive polymer molded article is described.

The thermally conductive polymer molded article is obtained by molding the above-described thermally conductive composition. In the thermally conductive polymer molded article, the liquid crystalline polymer and the thermally conductive filler in the thermally conductive composition are oriented in a predetermined direction by a magnetic field.

When a thermotropic liquid crystalline polymer is incorporated as a liquid crystalline polymer into the thermally conductive composition, the thermotropic liquid crystalline polymer in the composition, which is contained in a mold recess of a molding machine, is melted by heating so that it undergoes phase transition to a liquid crystalline state. Then, a magnetic field in a desired thermal conduction direction is applied to the thermally conductive composition by a magnetic field generating means. Thus, the thermotropic liquid crystalline polymer and thermally conductive filler are oriented so that the direction of the rigid molecular chains of the thermotropic liquid crystalline polymer and the direction of the second thermal conductivity ($\lambda_2$) of the thermally conductive filler, specifically, for example, the direction of the fiber axis of the carbon fibers are parallel to the magnetic lines of force. Then, the thermally conductive composition contained in the mold recess is cooled to allow the liquid crystalline polymer to transform it to a solid state, thus obtaining a thermally conductive polymer molded article.

When a lyotropic liquid crystalline polymer is incorporated as a liquid crystalline polymer into the thermally conductive composition, a solution of the thermally conductive composition including the lyotropic liquid crystalline polymer is contained in a mold recess portion in a molding machine. Then a magnetic field is applied to the solution in the recess by a magnetic field generating means. Thus, the direction of the rigid molecular chains of the liquid crystalline polymer in the solution and the direction of the second thermal conductivity ($\lambda_2$) of the thermally conductive filler are oriented parallel to the magnetic lines of force. Then, the solvent is removed by, e.g., volatilization to allow the liquid crystalline polymer to transform it from the liquid crystalline state to a solid state, thus obtaining a thermally conductive polymer molded article.

Examples of magnetic field generating means include a permanent magnet, an electromagnet, a superconducting magnet, and a coil. Higher magnetic flux density of the magnetic field generated by the magnetic field generating means increases the degree of orientation of the liquid crystalline polymer and thermally conductive filler, providing a higher thermal conductivity to a thermally conductive polymer molded article obtained. The magnetic flux density of the magnetic field to be applied is preferably 1 to 20 teslas (T), more preferably 2 to 20 T, most preferably 3 to 20 T. When the magnetic flux density is less than 1 T, orientation of the rigid molecular chains of the thermotropic liquid crystalline polymer and the thermally conductive filler may be unsatisfactory, making it difficult to obtain a thermally conductive polymer molded article having a higher thermal conductivity. On the other hand, it is practically difficult to obtain a magnetic field having a magnetic flux density of higher than 20 T. When the magnetic flux density is in the range of from 3 to 20 T, thermally conductive polymer molded article having a higher thermal conductivity can be obtained and the magnetic flux density in such a range is practical.

Examples of molding machines that can be used include a machine for molding a synthetic resin, such as an injection molding machine, an extrusion machine, or a press molding machine. The thermally conductive composition can be molded into thermally conductive polymer molded articles having various forms, such as a sheet, a film, a block, a particle, and a fiber. The thermally conductive polymer molded article can be used in printed circuit boards, semiconductor packages, housings, and radiating members, such as heat pipes, radiating panels, and heat diffusion panels to conduct the heat generated by various electronic parts and dissipate the heat out of the electronic equipment.

In the thermally conductive polymer molded article of the present invention, when the molecular chains of the liquid crystalline polymer and the particles or fibers of the thermally conductive filler are oriented in a predetermined direction, the thermal conductivity ($\lambda$) of the molded article is extremely high in the direction of the orientation. The thermal conductivity ($\lambda$) is preferably 2.2 to 100 W/(m·K), more preferably 3.0 to 50 W/(m·K), most preferably 3.5 to 30 W/(m·K). When the thermal conductivity ($\lambda$) is less than 2.2 W/(m·K), effective transfer of heat generated by the electronic parts to the outside may be difficult. On the other hand, when the thermal conductivity ($\lambda$) exceeds 100 W/(m·K), molding may be difficult.

For an application which requires electrical insulation properties, the thermally conductive polymer molded article has preferably a volume resistivity of $1 \times 10^6$ to $1 \times 10^{20}$ Ω·cm, more preferably $1 \times 10^8$ to $1 \times 10^{18}$ Ω·cm, most preferably $1 \times 10^{12}$ to $1 \times 10^{18}$ Ω·cm. When the volume resistivity of the molded article is less than $1\times10^6$ Ω·cm, the electrical insulation properties obtained may be unsatisfactory. On the other hand, it is difficult to obtain a thermally conductive polymer molded article having a volume resistivity of more than $1\times10^{20}$ Ω·cm due to the physical properties of the liquid crystalline polymer.

When the thermally conductive polymer molded article of the present invention is molded into a sheet, the sheet has preferably a thickness of 0.02 to 10 mm, more preferably 0.1 to 7 mm, most preferably 0.2 to 3 mm. When the thickness of the sheet is less than 0.02 mm, the mechanical strength of the sheet may be unsatisfactory. On the other hand, when the thickness of the sheet exceeds 10 mm, the sheet may affect a weight of an apparatus, such as an electronic equipment, to be applied with the sheet. In addition, it is preferred that this sheet has a smaller thickness for small thermal resistance in the thickness direction. When the thickness of the sheet is 0.02 to 3 mm, the thermal resistance in the thickness direction can be reduced, while keeping excellent mechanical strength of the sheet. The thermally conductive polymer molded article in a sheet or a film can be used for a circuit board material and a radiating sheet or film for semiconductor package.

Next, a method for producing a thermally conductive polymer molded article according to one embodiment will be described in detail with reference to FIGS. 1 to 3. The thermally conductive composition of the present embodiment contains a thermotropic liquid crystalline polymer as the liquid crystalline polymer. The thermally conductive sheet 11 shown in FIG. 1, which is obtained as the thermally conductive polymer molded article of the present invention, can be applied to printed circuit boards and electronic equipment as a radiating member, such as a radiating sheet.

Firstly, an explanation is made on the case where the molecular chains of the thermotropic liquid crystalline polymer and the particles or fibers of the thermally conductive filler are oriented in the thickness direction of thermally conductive sheet 11. In this case, the direction of the rigid molecular chains of the thermotropic liquid crystalline polymer and the direction of the second thermal conductivity ($\lambda_2$) of the thermally conductive filler are aligned with the thickness direction of thermally conductive sheet 11 (the direction of Z axis in FIG. 1).

Figure 2:
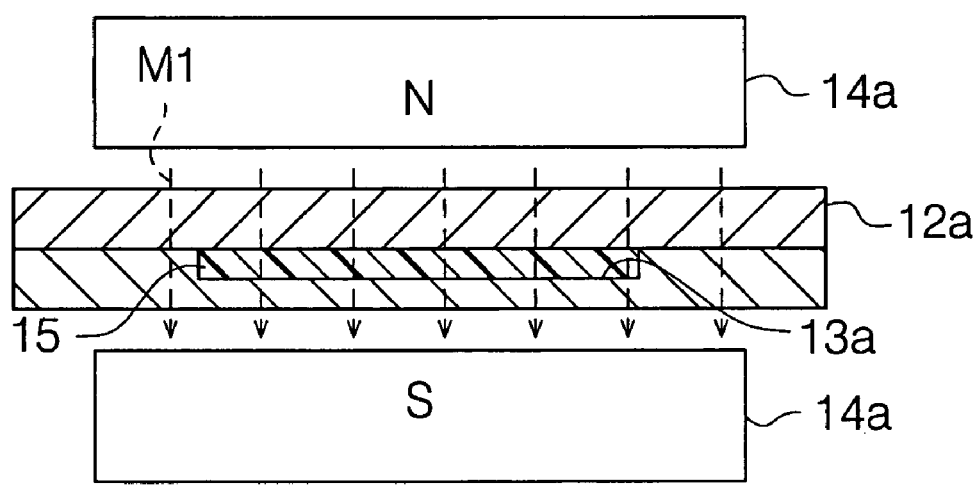
FIG. 2 is a conceptual view showing a method for producing a thermally conductive sheet of the present invention, which has high thermal conductivity in a direction along the thickness of the sheet.

As shown in FIG. 2, a mold 12a has a cavity 13a having a shape corresponding to the sheet therein. A pair of permanent magnets 14a, use as a magnetic field generating device, is disposed above and under the mold 12a. The direction of magnetic lines of force M1 of the magnetic field generated by permanent magnets 14a is parallel to the thickness direction of the cavity 13a. The cavity 13a is filled with a thermally conductive composition 15. The mold 12a has a heating apparatus (not shown). The heating apparatus keeps in a molten state the thermotropic liquid crystalline polymer contained in the thermally conductive composition 15 in the cavity so that the thermotropic liquid crystalline polymer undergoes phase transition to a liquid crystalline state. Then, a magnetic field is applied by means of the permanent magnets 14a to the thermally conductive composition 15 contained in the cavity 13a having the thermotropic liquid crystalline polymer in a liquid crystalline state. In this instance, the direction of magnetic lines of force M1 is parallel to the thickness direction of the thermally conductive composition 15 in a sheet. Accordingly, the direction of the rigid molecular chains of the thermotropic liquid crystalline polymer and the direction of the second thermal conductivity ($\lambda_2$) of the thermally conductive filler are aligned with the thickness direction of the thermally conductive composition 15 in a sheet form, so that the molecular chains of the thermotropic liquid crystalline polymer and the particles or fibers of the thermally conductive filler can be oriented in the thickness direction. The thermally conductive composition 15 in such oriented state is cooled to allow the thermotropic liquid crystalline polymer to transform it to a solid state, and then removed from the mold 12a. Thus, the thermally conductive sheet 11, in which the direction of the rigid molecular chains of the thermotropic liquid crystalline polymer and the direction of the second thermal conductivity ($\lambda_2$) of the thermally conductive filler are aligned with the thickness direction, can be obtained.

Next, a method for producing a thermally conductive polymer molded article according to another embodiment of the present invention is described. In the method according to another embodiment, the direction of the rigid molecular chains of the thermotropic liquid crystalline polymer and the direction of the second thermal conductivity ($\lambda_2$) of the thermally conductive filler are aligned with the direction parallel to the surface of the thermally conductive sheet 11 (the directions of X axis or Y axis in FIG. 1).

Figure 3:
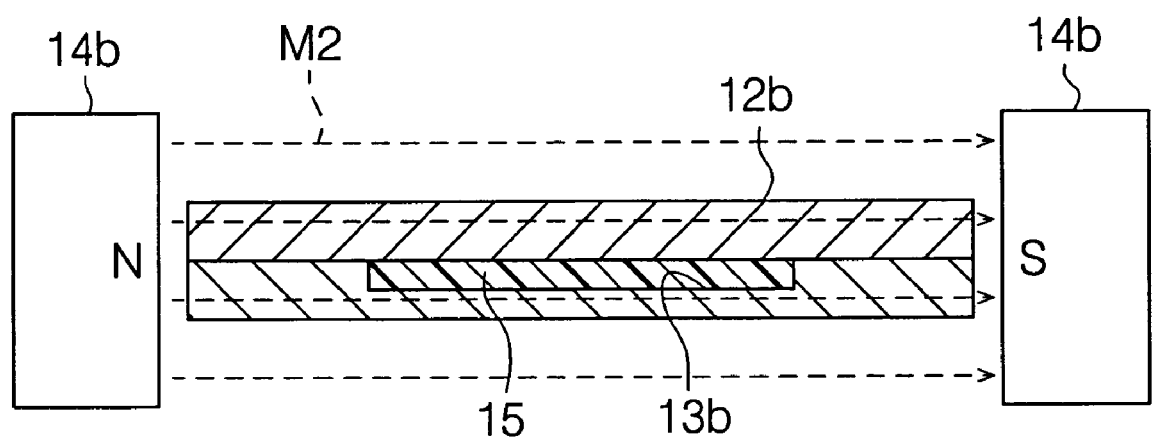
FIG. 3 is a conceptual view showing a method for producing a thermally conductive sheet of the present inven-

As shown in FIG. 3, a pair of permanent magnets 14b is disposed either side of the mold 12b so that magnetic lines of force M2 pass the mold in the transverse direction of the cavity 13b of the mold 12b having a shape corresponding to the sheet to be formed. A magnetic field is applied by means of the permanent magnets 14b to the thermally conductive composition 15 filled in the cavity 13b having the thermotropic liquid crystalline polymer in a liquid crystalline state. In this instance, the direction of magnetic lines of force M2 is parallel to the surface of the thermally conductive composition 15 in a sheet form. Accordingly, the direction of the rigid molecular chains of the thermotropic liquid crystalline polymer and the direction of the second thermal conductivity ($\lambda_2$) of the thermally conductive filler are parallel to the surface of the thermally conductive composition 15, so that the molecular chains of the thermotropic liquid crystalline polymer and the particles or fiber of the thermally conductive filler can be oriented in the direction parallel to the surface of the thermally conductive composition 15. The thermally conductive composition 15 in this oriented state is solidified with cooling, and then removed from the mold 12b to obtain a thermally conductive sheet 11 in which the direction of the rigid molecular chains of the thermotropic liquid crystalline polymer and the direction of the second thermal conductivity ($\lambda_2$) of the thermally conductive filler are aligned with the direction parallel to the surface of the sheet.

In the above-described production method, when a lyotropic liquid crystalline polymer is used instead of the thermotropic liquid crystalline polymer, a thermally conductive sheet 11 can be obtained in accordance with substantially the same procedure as abovementioned except that the phase transition to a liquid crystalline state is achieved by dissolving the lyotropic liquid crystalline polymer in a solvent and the phase transition from the liquid crystalline state to a solid state is achieved by removing the solvent.

The thermally conductive polymer molded article according to one embodiment of the present invention is formed of a thermally conductive composition which comprises a liquid crystalline polymer and a thermally conductive filler having magnetic anisotropy. The thermally conductive filler has a second thermal conductivity ($\lambda_2$) in at least one direction higher than the first thermal conductivity ($\lambda_1$) of the liquid crystalline polymer. The direction of the molecular chains of the liquid crystalline polymer and the direction of the second thermal conductivity ($\lambda_2$) of the thermally conductive filler are aligned with a desired thermal conduction direction in the thermally conductive polymer molded article obtained. The molecular chains of the liquid crystalline polymer are generally long, slender, and rigid along its length, and therefore the thermal conductivity of the thermally conductive polymer molded article can be improved in a direction along the molecular chains. Further, the thermally conductive filler is oriented so that the direction of the second thermal conductivity ($\lambda_2$) of the thermally conductive filler is matched to the desired thermal conduction direction in the thermally conductive polymer molded article, and hence the thermal conductivity of the thermally conductive polymer molded article can be improved in the desired direction. Therefore, the thermally conductive polymer molded article of the present invention can exhibit excellent thermal conductivity.

In one embodiment of the present invention, the thermotropic liquid crystalline polymer contained in the thermally conductive polymer molded article comprises at least one of the polymers selected from (A) thermotropic liquid crystalline wholly aromatic polyester and (B) thermotropic liquid crystalline wholly aromatic polyester amide. These thermotropic liquid crystalline polymers have excellent moldability, and can be easily molded into various shapes to obtain a thermally conductive polymer molded article having a high thermal conductivity ($\lambda$).

In another embodiment of the present invention, the thermally conductive filler contained in the thermally conductive polymer molded article comprises at least one of the fillers selected from carbon fibers, graphite, boron nitride, silicon nitride, aluminum nitride, silicon carbide, and aluminum oxide. These thermally conductive fillers have a higher second thermal conductivity ($\lambda_2$), providing more excellent thermal conductivity to the thermally conductive polymer molded article.

In one embodiment of the present invention, the thermally conductive filler contained in the thermally conductive polymer molded article comprises at least one of carbon fibers and graphite, wherein each of the carbon fibers and the graphite has a second thermal conductivity of 200 to 2000 W/(m·K) in at least one direction. These thermally conductive fillers have higher second thermal conductivity ($\lambda_2$) as well as higher magnetic anisotropy, allowing the filler to be easily oriented by a magnetic field. Thus, such filler can provide further excellent thermal conductivity in a desired direction to the thermally conductive polymer molded article.

In one embodiment of the present invention, the thermally conductive polymer molded article is molded into a sheet to form a thermally conductive sheet 11. The liquid crystalline polymer and the thermally conductive filler are oriented in the thickness direction of the thermally conductive sheet 11 by a magnetic field. The thermally conductive polymer molded article having such a construction can be readily used in an application, such as a circuit board material and a radiating sheet, in which the article is in the form of a sheet and in which the article needs to have excellent thermal conductivity in the thickness direction.

Conventionally, for achieving orientation of a liquid crystalline polymer and thermally conductive filler, a fluid field has been used for exerting a force on the substance using fluidity or a shear field has been used for exerting a shear force on the substance. In the thermally conductive polymer molded article of the present invention, the liquid crystalline polymer and the thermally conductive filler are oriented by controlling the magnetic lines of force in a magnetic field. Therefore, the liquid crystalline polymer and the thermally conductive filler can be easily oriented in a desired thermal conduction direction in the thermally conductive polymer molded article having a three-dimensional form. This is advantageous from a practical point of view.

In the method for producing a thermally conductive polymer molded article according to one embodiment of the present invention, the liquid crystalline polymer undergoes phase transition into a liquid crystalline state, and a magnetic field is applied so that the liquid crystalline polymer and the thermally conductive filler are oriented in a predetermined direction. Then, the liquid crystalline polymer is allowed to undergo phase transition to a solid state to produce a thermally conductive polymer molded article. According to this method, a thermally conductive polymer molded article which can exhibit excellent thermal conductivity can be easily obtained.

In the method for producing a thermally conductive polymer molded article according to another embodiment of the present invention, the thermally conductive composition is molded into a sheet, and then the liquid crystalline polymer is allowed to undergo phase transition to a liquid crystalline state, and a magnetic field is applied so that the liquid crystalline polymer and the thermally conductive filler are oriented in the thermal conduction direction. Then, the liquid crystalline polymer is allowed to undergo phase transition to a solid state to form a thermally conductive polymer molded article. By this method, a thermally conductive polymer molded article can be easily obtained in the form of a sheet, which can exhibit excellent thermal conductivity in the thickness direction of the sheet or in the direction parallel to the surface of the sheet.

It should be apparent to those skilled in the art that the present invention may be embodied in many other specific forms without departing from the spirit or scope of the invention. Particularly, it should be understood that the invention may be embodied in the following forms.

For improving the thermal conductivity, thermally conductive filler having no magnetic anisotropy or thermally conductive filler having magnetic anisotropy but being oriented with difficulty by a magnetic field may be added into the thermally conductive composition. Examples of thermally conductive fillers of this type include aluminum hydroxide and the above-mentioned spherical aluminum oxide.

One of the pair of magnetic field generating devices disposed interposing a mold there between may be omitted.

The pair of magnetic field generating devices both may have the same S poles or N poles, and they may be disposed so that the S poles or N poles face to each other. That is, a magnetic field may be applied by adjusting the direction of the magnetic lines of force so that the liquid crystalline polymer is oriented in a desired thermal conduction direction by a magnetic field.

In the above embodiment, an adhesive layer may be formed on at least one surface of the thermally conductive sheet 11 for bonding the sheet to an object to be applied with the sheet. By virtue of having such a construction, the thermally conductive sheet 11 can be easily fixed to the object merely by putting the object on the adhesive layer of the thermally conductive sheet 11.

EXAMPLES

Next, the embodiments will be described in more detail with reference to the following Examples and Comparative Examples.

Example 1

To 100 parts by weight of thermotropic liquid crystalline wholly aromatic polyester (Rodrun LC5000, manufactured by UNITIKA LTD.; constituent units: terephthalic acid, 4-hydroxybenzoic acid, and ethylene glycol) as a liquid crystalline polymer was added 50 parts by weight of graphitized carbon fiber (manufactured by PETOCA MATERIALS LTD.; thermal conductivity: 1000 W/(m·K)) as thermally conductive filler having magnetic anisotropy, and then 40 parts by weight of aluminum oxide spherical powder (manufactured by SHOWA DENKO K.K.) as additional thermally conductive filler with no magnetic anisotropy was added thereto to prepare a mixture. The mixture was melt-kneaded by means of an extruder to prepare a thermally conductive composition in a pellet form. After dehumidifying and drying, the thermally conductive composition was injection molded to into a molded article in the form of sheet having a size of 50 mm (length)×50 mm (width)×2 mm (thickness). The resultant sheet-form molded article was placed in a cavity of a mold heated to 340° C., and molten in a magnetic field at a magnetic flux density of 10 T using a superconducting magnet, allowing the thermotropic liquid crystalline wholly aromatic polyester contained in the sheet-form molded article to undergo phase transition to a liquid crystalline state. In this instance, the direction of the magnetic lines of force was parallel to the thickness direction of the sheet-form molded article. The molded article was held in the magnetic field for 20 minutes, and then cooled to room temperature to allow the thermotropic liquid crystalline wholly aromatic polyester contained in the sheet-form molded article to undergo phase transition to a solid state, thus producing a thermally conductive sheet having a thickness of 2 mm as a thermally conductive polymer molded article.

Examples 2 to 4

The same thermotropic liquid crystalline wholly aromatic polyester as that used in Example 1, the thermally conductive filler having magnetic anisotropy shown in Table 1, and the same aluminum oxide spherical powder as that used in Example 1 as additional thermally conductive filler with no magnetic anisotropy were mixed together to prepare mixtures. Each of the resultant mixtures was injection molded in the same manner as in Example 1 to prepare a sheet-form molded article. From each of the sheet-form molded article obtained, a thermally conductive sheet having a thickness of 2 mm as a thermally conductive polymer molded article was produced in the same manner as in Example 1.

Example 5

The same thermotropic liquid crystalline wholly aromatic polyester as that used in Example 1, the thermally conductive filler having magnetic anisotropy shown in Table 1, and the same aluminum oxide spherical powder as that used in Example 1 as additional thermally conductive filler with no magnetic anisotropy were mixed together to prepare a mixture. The resultant mixture was injection molded in the same manner as in Example 1 to prepare a sheet-form molded article. From the sheet-form molded article prepared, a thermally conductive sheet having a thickness of 2 mm as a thermally conductive polymer molded article was produced in substantially the same manner as in Example 1 except that the magnetic flux density was 15 T.

Comparative Examples 1 and 2

The same thermotropic liquid crystalline wholly aromatic polyester as that used in Example 1, the thermally conductive filler having magnetic anisotropy shown in Table 2, and the same aluminum oxide spherical powder as that used in Example 1 as additional thermally conductive filler with no magnetic anisotropy were mixed together to prepare mixtures. From each of the resultant mixtures, a sheet-form molded article was prepared in the same manner as in Example 1. The sheet-form molded article was placed in a cavity of a mold heated to 340° C., and molten without applying a magnetic field to allow the thermotropic liquid crystalline wholly aromatic polyester to undergo phase transition to a liquid crystalline state. The molded article was kept in a liquid crystalline state for 20 minutes, and then solidified by cooling to room temperature to produce a polymer sheet having a thickness of 2 mm. In this Example, a treatment of putting the sheet-form molded article in a magnetic field was not conducted.

Comparative Example 3

To 100 parts by weight of polycarbonate (manufactured by Mitsubishi Engineering-Plastics Corporation) was added 100 parts by weight of the same carbon fiber as that used in Example 1 as thermally conductive filler having magnetic anisotropy and 40 parts by weight of the same aluminum oxide spherical powder as that used in Example 1 as additional thermally conductive filler with no magnetic anisotropy to prepare a mixture. From the mixture prepared, a sheet-form molded article was prepared in the same manner as in Example 1.

The sheet-form molded article was applied with a magnetic field and solidified by cooling to room temperature in the same manner as in Example 1 to produce a polymer sheet having a thickness of 2 mm.

With respect to each of the thermally conductive sheets obtained in Examples 1 to 5 and polymer sheets in Comparative Examples 1 to 3, a thermal conductivity was determined by multiplying a thermal diffusivity by a density and a specific heat. The thermal diffusivity was measured by a laser flash method. In addition, orientation of the molecular chains of the liquid crystalline polymer and the fiber or particles of the thermally conductive fillers contained in each of the thermally conductive sheets and polymer sheets obtained was examined by observation through a scanning electron microscope and X-ray diffraction measurement.

The results of Examples 1 to 5 are shown in Table 1, and the results of Comparative Examples 1 to 3 are shown in Table 2. In the Tables below, with respect to the orientation, when orientation in a desired thermal conduction direction (thickness direction of the sheet) was confirmed in both the molecular chains of the liquid crystalline polymer and the fibers or particles of the thermally conductive fillers, "Confirmed" is shown, and, when no orientation was confirmed, "None" is shown.

TABLE 1

|  |  | Examples | | | | |
| --- | --- | --- | --- | --- | --- | --- |
|  |  | 1 | 2 | 3 | 4 | 5 |
| Formulation (Part by weight) | Liquid crystalline polymer | 100 | 100 | 100 | 100 | 100 |
|  | Polycarbonate | 0 | 0 | 0 | 0 | 0 |
|  | Carbon fiber | 50 | 100 | 0 | 0 | 100 |
|  | Boron nitride | 0 | 0 | 50 | 100 | 0 |
|  | Aluminum oxide | 40 | 40 | 40 | 40 | 40 |
| Magnetic flux density (T) |  | 10 | 10 | 10 | 10 | 15 |
| Orientation |  | Confirmed | Confirmed | Confirmed | Confirmed | Confirmed |
| Thermal conductivity [W/(m · K)] |  | 2.78 | 7.50 | 2.41 | 3.05 | 9.83 |

TABLE 2

|  |  | Comparative Examples | | |
| --- | --- | --- | --- | --- |
|  |  | 1 | 2 | 3 |
| Formulation (Part by weight) | Liquid crystalline polymer | 100 | 100 | 0 |
|  | Polycarbonate | 0 | 0 | 100 |
|  | Carbon fiber | 100 | 0 | 100 |
|  | Boron nitride | 0 | 100 | 0 |
|  | Aluminum oxide | 40 | 40 | 40 |
| Magnetic flux density (T) |  | 0 | 0 | 10 |
| Orientation |  | None | None | None |
| Thermal conductivity [W/(m · K)] |  | 2.01 | 1.90 | 1.98 |

As can be seen in Table 1, it is confirmed that the liquid crystalline polymer and the thermally conductive filler are oriented in each of the thermally conductive sheets of Examples 1 to 5. In addition, each of the thermally conductive sheets of Examples 1 to 5 has a thermal conductivity (λ) of 2.2 W/(m·K) or higher, and thus these thermally conductive sheets have excellent thermal conductivity. Further, in comparison of Example 2 and Example 5 having the same formulation, it is found that a thermally conductive sheet having higher thermal conductivity can be obtained when the applied magnetic flux density is increased.

As can be seen from Table 2, each of the polymer sheets in Comparative Examples 1 and 2 was prepared without applying a magnetic field, and hence no orientation of the liquid crystalline polymer and the thermally conductive filler was confirmed. Each of the polymer sheets in Comparative Examples 1 and 2 has a thermal conductivity (λ) of lower than 2.2 W/(m·K). Thus, in these polymer sheets, satisfactory thermal conductivity cannot be obtained. In the polymer sheet of Comparative Example 3, orientation of the thermally conductive filler was confirmed since it was prepared while applying a magnetic field. However, the polymer sheet of Comparative Example 3 was incorporated with polycarbonate having no liquid crystallinity instead of a liquid crystalline polymer, and hence no orientation of the polycarbonate is confirmed and satisfactory thermal conductivity is not obtained.

The present examples and embodiments are to be considered as illustrative and not restrictive and the invention is not to be limited to the details given herein, but may be modified within the scope and equivalence of the appended claims.

The invention claimed is:

1. A thermally conductive polymer molded article formed by molding a thermally conductive composition, the thermally conductive composition comprising:
   100 parts by weight a liquid crystalline polymer having a first thermal conductivity; and
   5 to 800 parts by weight a thermally conductive filler having a second thermal conductivity in at least one direction, which has magnetic anisotropy,
   wherein the liquid crystalline polymer and the thermally conductive filler are oriented in the molded article by a magnetic field.

2. The thermally conductive polymer molded article according to claim 1, wherein the second thermal conductivity is higher than the first thermal conductivity.

3. The thermally conductive polymer molded article according to claim 1, wherein the liquid crystalline polymer includes a thermotropic liquid crystalline polymer.

4. The thermally conductive polymer molded article according to claim 3, wherein the thermotropic liquid crystalline polymer comprises at least one polymer selected from the group consisting of a thermotropic liquid crystalline wholly aromatic polyester and a thermotropic liquid crystalline wholly aromatic polyester amide.

5. The thermally conductive polymer molded article according to claim 1, wherein the liquid crystalline polymer includes a lyotropic liquid crystalline polymer.

6. The thermally conductive polymer molded article according to claim 1, wherein the thermally conductive filler comprises at least one filler selected from the group consisting of carbon fibers, graphite, boron nitride, silicon nitride, aluminum nitride, silicon carbide, and aluminum oxide.

7. The thermally conductive polymer molded article according to claim 1, wherein the thermally conductive filler comprises at least one of selected from carbon fiber and graphite, wherein each of the carbon fiber and the graphite has a thermal conductivity of 200 to 2000 W/(m K) in at least one direction.

8. The thermally conductive polymer molded article according to claim 1, wherein the thermally conductive filler has electrical insulation properties.

9. The thermally conductive polymer molded article according to claim 1, wherein the thermally conductive polymer molded article is molded into a sheet, and wherein the liquid crystalline polymer and the thermally conductive filler are oriented in the thickness direction of the sheet by a magnetic field.

10. The thermally conductive polymer molded article according to claim 1, which is molded into a sheet form, wherein the liquid crystalline polymer and the thermally conductive filler are oriented in the direction parallel to the surface of the sheet by a magnetic field.

11. A method for producing a thermally conductive polymer molded article formed of a thermally conductive composition, the thermally conductive composition comprising 100 parts by weight a liquid crystalline polymer and 5 to 800 parts by weight a thermally conductive filler having magnetic anisotropy, the method comprising steps of: providing the thermally conductive composition into a mold; allowing the liquid crystalline polymer in the thermally conductive composition in the mold to undergo phase transition to a liquid crystalline state; placing the thermally conductive composition in the mold in a magnetic field, thereby orienting the liquid crystalline polymer and the thermally conductive filler contained in the thermally conductive composition in a predetermined direction; allowing the liquid crystalline polymer in a liquid crystalline state to undergo phase transition to a solid state; solidifying the thermally conductive composition; and removing the solidified composition from the mold.

12. The method according to claim 11, wherein the step of allowing the liquid crystalline polymer to undergo phase transition to the liquid crystalline state is achieved by heating, and the step of allowing the liquid crystalline polymer to undergo phase transition to the solid state and the step of solidifying the thermally conductive composition are both achieved by cooling.

13. The method according to claim 11, wherein the thermally conductive composition further contains a solvent, and wherein the step of allowing the liquid crystalline polymer to undergo phase transition to the liquid crystalline state is achieved by dissolving the liquid crystalline polymer into a solvent, and the step of allowing the liquid crystalline polymer to undergo phase transition to a solid state is achieved by removing the solvent.

14. An apparatus for producing a thermally conductive polymer molded article formed of a thermally conductive composition, the thermally conductive composition comprising 100 parts by weight a liquid crystalline polymer and 5 to 800 parts by weight a thermally conductive filler having magnetic anisotropy, wherein the liquid crystalline polymer and the thermally conductive filler are oriented in a predetermined direction, the apparatus comprising: a mold having a cavity for containing the thermally conductive composition therein to mold the thermally conductive composition into a predetermined shape; and a magnetic field generating device, located so that magnetic lines of force generated by the magnetic field generating device pass the cavity of the mold.

15. The apparatus according to claim 14, wherein the magnetic field generating device comprises a pair of permanent magnets respectively having opposite poles wherein the pair of permanent magnets are disposed interposing the cavity there between.

* * * * *